United States Patent [19]

Bloechl et al.

[11] Patent Number: 4,768,225
[45] Date of Patent: Aug. 30, 1988

[54] TELEPHONE STATION SET FOR TABLE WALL OPERATIONS

[75] Inventors: Franz Bloechl; Juergen Ruschel, both of Bocholt, Fed. Rep. of Germany

[73] Assignee: Siemens Aktiengesellschaft, Berlin and Munich, Fed. Rep. of Germany

[21] Appl. No.: 865,237

[22] Filed: May 20, 1986

[30] Foreign Application Priority Data

May 21, 1985 [DE] Fed. Rep. of Germany ....... 3518250

[51] Int. Cl.$^4$ .............................................. H04M 1/02
[52] U.S. Cl. ..................................... 379/435; 379/450
[58] Field of Search ............... 379/425, 428, 435, 440, 379/445, 450

[56] References Cited

U.S. PATENT DOCUMENTS

| | | | |
|---|---|---|---|
| 3,073,911 | 1/1963 | Mattke et al. | 379/424 |
| 3,941,951 | 3/1976 | Engstrom et al. | 379/436 |
| 4,395,591 | 7/1983 | Kaczkos | 379/435 |

FOREIGN PATENT DOCUMENTS 2920262 11/1980 Fed. Rep. of Germany .
2920286 8/1981 Fed. Rep. of Germany .

OTHER PUBLICATIONS

Article, "Reversible Hook for Desk/Wall Convertible Telephone Sets", by Gotway et al., AT&T Technologies, pp. 9 and 10, Jan. 1984.

*Primary Examiner*—Jin F. Ng
*Assistant Examiner*—Randall P. Myers
*Attorney, Agent, or Firm*—James G. Morrow

[57] ABSTRACT

A telephone set housing (1) is disclosed having at least one cradle (2) arranged in a base component of the housing for receiving the handset. In the region of the cradle, a filler body (5) is provided which, for a desk application of the telephone set housing (1), flushes with the cradle (2), whereas, for the use of the telephone set (1) as a wall-mounted set, a projection (1) which is integrally connected to the filler body projects beyond the contours of the cradle (2). The filler body (5) is secured in such manner that the subscriber himself/herself can easily convert the telephone set housing (1) for desk or wall-mounted application. For this purpose, there is provided at least one freely accessible recess (3) in the region of the cradle (2) into which recess the filler body (5) can be inserted by means of a catch connection in two operating positions.

6 Claims, 1 Drawing Sheet

TELEPHONE STATION SET FOR TABLE WALL OPERATIONS

BACKGROUND OF THE INVENTION

1. Technical Field

The present invention relates to the field of telephone station apparatus, and particularly to station sets for desk or wall-mounted operation. The present invention comprises at least one cradle, provided in the outer surface of a stationary housing component, for a handset. A filler body can be attached in the region of this cradle and, when the telephone device is used as a table device, the body is flush with the cradle, whereas, when the telephone device is used as a wall set, a projection which forms an integral part of the filler body projects beyond the contours of the cradle and engages into an opening in the handset.

2. Description of the Prior Art

In telephones which are designed to be used both in the horizontal and in the vertical operating position as a so-called desk set or a wall-mounted set, an optimum design of the handset receiver of the housing of the base is subject to the problem of the different directions in which the gravitational force acts upon the handset when it sets on the base in the two operating positions. The handset is first to be accommodated in a shock-resistant fashion on the housing component cradle in both operating positions of the telephone set and, under the influence of the gravitational force, is, secondly, to secure the mechanical actuating element of the cradle switch displaced against the elastic bias thereof. The handset is to be able to be brought into the rest position on the housing in a simple manner in both operating positions, and, on the other hand, the handset is to be able to be lifted without obstruction in both operating positions of the telephone set.

It is known, for example, to provide a station set with one of two differently-shaped housing edges or caps depending upon the operating position. The difference between the two caps need relate only to the region of the handset cradle where it can consist, for example, of a greater or lesser projection of a rigid collar at the edge of the cradle for the transmitter portion of the handset.

A housing cap which is the optimum design for wall operation can result in the fact that when this cap is incorrectly used in a desk set, it becomes extremely difficult to lift the handset due to the incorrect access direction and can mean that when the handset is lifted quickly the base component is also pulled up since the stability of the desk set is dependent solely upon the device's own weight, whereas in the case of the wall-mounted set it is governed by the securing elements which serve to connect the base component to the wall. In contrast, the use of a housing intended for a desk device as a wall telephone can lead to an insufficiently secure positioning of the handset in the cradle and an unsatisfactory actuation of the cradle switch.

A more favorable solution of the problem is achieved by the use of a filler body which, depending upon whether the telephone device is used as a desk or wall-mounted set, is secured in two insert positions in the region of the cradle.

Thus, the German OS No. 32 07 824 provides a filler body inside the telephone set which on the one hand adapts itself to the contours of the cradle for desk operation of the telephone set and on the other hand, for the wall operation of the telephone set, by means of a projection engages the handset transmitter portion through a recess in that edge zone of the cradle which forms the bearing for the handset.

One disadvantage of this known embodiment consists in that the filler body is screwed to the telephone device so that a tool in the form of a screwdriver is required in order to release the filler body from the base. A further disadvantage consists in that in order to change the insert position of the filler body, additional opening and—following modification—closure of the telephone set is required.

This last described disadvantage does not occur in the case of a telephone set disclosed through the U.S. Pat. No. 4,395,591. In this embodiment, the cradle region of the base housing contains a rectangular recess which serves to accommodate a projection which forms part of the filler body. However, even in this known arrangement, it must be considered disadvantageous that the filler body is screwed to the telephone device. Strip-like and cap-like elements are additionally used to cover the screw connection so that a not inconsiderable time and assembly expense is required in order to change the insert position of the filler body.

Therefore, the object of the present invention is to provide a solution whereby a telephone can be re-equipped for the two operating positions by the subscriber him/herself at any time and in a simple manner.

SUMMARY OF THE INVENTION

The above-described problems and related problems of prior art station sets are solved by the present invention in that in the region of the cradle there is provided at least one freely accessible recess into which the filler body can be inserted in two operating positions and can be secured by means of a catch connection.

Here it is conceivable to provide at least one recess on the bottom of the cradle area into which the filler body can be engaged in accordance with its use. For wall operation, the filler body can engage by means of an appropriate attachment or hook into an appropriately-shaped opening provided, for example, in the region of the transmitter of the handset.

However, for reasons of production technology, it has proved expedient for the wall-mounted use of the telephone set, to provide the recess at the lowest point of that edge zone of the cradle which forms the bearing for the handset. This arrangement of the recess, on the one hand, has the advantage that it is always freely accessible, i.e. it is unnecessary to screw the filler body of the telephone set base into position. On the other hand, the filler body can at any time be disengaged from the subscriber without the use of special tools. It can be turned into the desired operating position and then simply inserted into the recess. This also obviates the need for additional securing and covering of components.

Here, two oppositely-located side walls of the recess can be connected to one another via a bridge. The free ends of the filler body, which face towards one another and are spaced from one another and each have U-shaped cross-section, engage under the bridge of the recess without play. The free ends of the filler body can be arranged so as to be slightly inclined towards its base so that the ends abut against the bridge under bias.

The aforementioned side walls of the recess can also be provided with short attachments which are integrally connected to the side walls and which project into the recess and which serve as a guide and bearing for the filler body.

In the following description of the drawings, the invention will be explained with reference to an exemplary embodiment.

DETAILED DESCRIPTION

Figure 1:
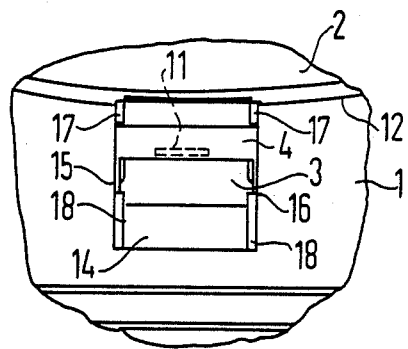
FIG. 1 is a plain view of a recess in the telephone set in the region of the handset cradle, where the filler body has not been inserted.

The telephone set housing 1 shown in part in the drawings is provided with a recess 3 at the edge region of a cradle 2 for the handset transmitter (not shown). As can be seen from FIG. 1, a bridge 4 which serves to connect two side walls 15 and 16 is arranged inside this recess 3. That part of the bridge 4 which faces towards the interior of the telephone set housing 1 is provided with an integrally connected stop 11.

Figure 4:
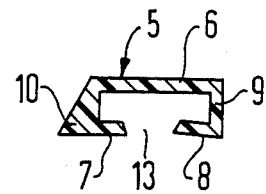
FIG. 4 shows the filler body in a sectional side view.

The recess 3 forms an engagement bearing for a filler body 5, shown in cross-sectional view in FIG. 4. The filler body is to permit the telephone set to be used either as a desk set or a wall-mounted set. With an offset corresponding approximately to the thickness of the filler body 5 relative to the interior of the telephone set housing 1, an additional bridge 14 having a U-shaped cross-section connects these two side walls 15 and 16 of the recess 3. In the region of the side walls 15 and 16 of the recess the plane of the bridge 3 also contains attachments 17 and 18 which serve as a guide and bearing for the inserted filler body.

The filler body 5 (FIG. 4) has a double U-shaped cross-section (each end being U-shaped). The free ends 7 and 8 are arranged approximately parallel to and at an interval from the base 6 of the filler body 5 and are integrally connected thereto. Whereas the free end 8 is connected to the base 6 via an intermediate zone 9 which extends at right-angles to the base, the intermediate zone which serves to connect the base 6 and the free end 7 consists of a tapered projection 10. The internal width between the free ends 7 and 8 here is somewhat greater than the width of the bridge 4.

Figure 2:
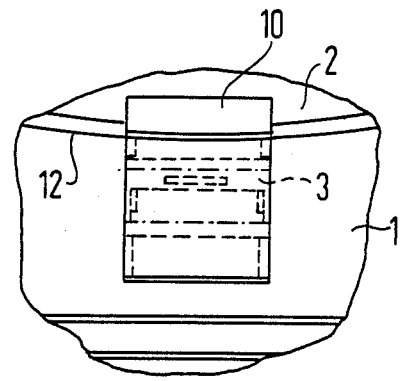
FIG. 2 shows the same recess in the telephone set which here is used as a wall-mounted set, with the filler body inserted.

As mentioned above, FIG. 2 illustrates the position of the filler body 5 in which the telephone set can be used as a wall-mounted set with the handset safely accommodated. In this case, the projection 10 of the filler body 5 projects beyond the edge zone 12 of the cradle 2. The projection 10 engages into a recess of approximately matching shape in the handset, e.g. in the region of the transmitter thereof, and thus prevents the handset from undesirably slipping out of the cradle 2 of the telephone set 1.

Figure 3:
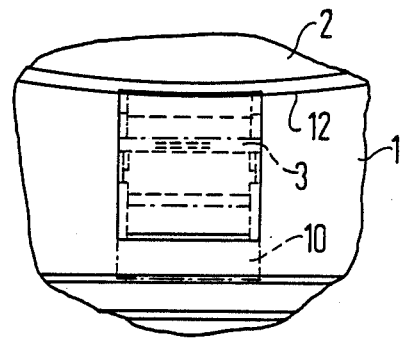
FIG. 3 shows the same recess in the telephone set which here is used as a desk set and with the filler body inserted.

When the filler body occupies the position shown in FIG. 3, the intermediate zone 9 flushes with the contours of the edge zone 12 of the cradle so that when the telephone set 1 is used as a desk set the handset can be replaced and removed from the cradle provided for this purpose without obstructive projections.

The filler body 5 is engaged inside the recess. This catch connection is achieved by the free ends 7 and 8 which engage under the bridge 4. The removal forces required to remove the filler body 5 can be further increased if the free ends 7 and 8 each incline slightly towards the base 6. For the relevant usage of the telephone set as either a desk set or a wall-mounted set, the filler body 5 engaged in the recess 3 can be quickly pushed out of the recess in the direction towards the cradle 2 by means of a simple tool, e.g. a paper clip, until the catch connection under the bridge is released.

By removing the filler body 5 from the recess 3 and then carrying out a 180 degree turn, the filler body can be reinserted into the recess 3 for the desired purpose of use without the assistance of complicated tools. Here the attachment 11 serves as a stop for the free ends 7 and 8 of the filler body 5.

What is claimed is:

1. A telephone set housing comprising:
    a housing base defining an outer surface;
    at least one handset cradle arranged on the outer surface of the housing base;
    a filler body having a generally double U-shaped cross-section defining a projection, a base, a first free end and a second free end; and
    at least one recess arranged on the outer surface adjacent to the handset cradle adapted to accept the first free end and the second free end, the recess and free ends cooperating to fix the filler body to the outer surface in a first position or a second position;
    the projection of the filler body being engageable with an opening of a telephone handset while being in the first position.

2. The telephone set housing of claim 1 wherein the filler body forms a bearing surface for a handset while being in the second position.

3. The telephone set housing of claim wherein the recess defines a first sidewall and a second sidewall, the sidewalls being oppositely-located and connected by a bridge, the free ends of the filler body being disposed towards one another and engaging the recess securely.

4. The telephone set housing of claim 3 wherein the recess further defines a plurality of short attachments which engage into the recess.

5. The telephone set housing of claim 3, further characterized in that the free ends of the filler body are arranged such that they incline slightly towards the base thereof.

6. The telephone set housing of claim 3, further characterized in that the bridge has a projection which faces towards the interior of the telephone set housing, the projection functioning as a stop for the free ends.

* * * * *